(12) United States Patent
Weng et al.

(10) Patent No.: US 9,200,152 B2
(45) Date of Patent: Dec. 1, 2015

(54) ELASTOMERIC NANOCOMPOSITES, NANOCOMPOSITE COMPOSITIONS, AND METHODS OF MANUFACTURE

(75) Inventors: Weiqing Weng, Houston, TX (US);
Michael B. Rodgers, Seabrook, TX (US); Molly W. Johnston, Baytown, TX (US); John P. Soisson, Houston, TX (US); Robert N. Webb, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 13/013,551

(22) Filed: Jan. 25, 2011

(65) Prior Publication Data
US 2012/0190772 A1      Jul. 26, 2012

(51) Int. Cl.
C08K 3/04       (2006.01)
C08K 3/34       (2006.01)
C08L 23/22      (2006.01)

(52) U.S. Cl.
CPC . *C08L 23/22* (2013.01); *C08K 3/04* (2013.01); *C08K 3/346* (2013.01); *C08K 2201/008* (2013.01); *C08K 2201/011* (2013.01)

(58) Field of Classification Search
CPC ........... C08K 3/04; C08K 3/346; C08L 23/22
USPC ......................................... 524/445, 447, 495
IPC .......................................................... C08K 3/04
See application file for complete search history.

(56) References Cited

U.S. PATENT DOCUMENTS

| | | | | |
|---|---|---|---|---|
| 3,025,259 A | * | 3/1962 | Kendall et al. | 523/215 |
| 3,639,308 A | * | 2/1972 | Topcik | 152/510 |
| 3,950,304 A | * | 4/1976 | Inomata et al. | 524/445 |
| 4,861,674 A | * | 8/1989 | Inaba | G11B 5/7305 428/847.2 |
| 5,209,872 A | * | 5/1993 | Takahashi et al. | 252/511 |

(Continued)

FOREIGN PATENT DOCUMENTS

CN    101348593 A  *  1/2009
FR    2918669 A1  *  1/2009

(Continued)

OTHER PUBLICATIONS

Massey (Permeability Properties of Plastics and Elastomers: A Guide to Packaging and Barrier Materials. Introduction: Table 28 Conversion Factors for Common Units of Permeability measurements. Plastics Design Library. 2003, p. 52).*

(Continued)

*Primary Examiner* — Brieann R Fink

(57) ABSTRACT

An elastomeric nanocomposite contains: (a) at least one elastomer comprising units derived from isoolefins having from 4 to 7 carbon atoms; (b) at least 10 phr of a carbon black; and (c) at least 1 phr of a nanoclay; wherein when the nanocomposite is used in an article, the article has a gas permeation coefficient of 80.0 cc*mm/[m$^2$-day] at 40° C. The carbon black may be graphitized to reduce interactions between the carbon black and the nanoclays. The elastomeric nanocomposite may, with or without the use of the graphitized carbon black, may calendared or extruded in such a manner as to orient the nanoclay platelets within the composition such that the oriented nanoclay elastomer nanocomposite has an orientation parameter of greater than 0.15.

15 Claims, 2 Drawing Sheets

(56) References Cited

U.S. PATENT DOCUMENTS

| | | | | |
|---|---|---|---|---|
| 5,540,950 | A * | 7/1996 | Izawa | C04B 35/573 427/228 |
| 5,576,372 | A | 11/1996 | Kresge et al. | |
| 5,576,373 | A | 11/1996 | Kresge et al. | |
| 5,607,770 | A * | 3/1997 | Lewis et al. | 428/408 |
| 5,665,183 | A | 9/1997 | Kresge et al. | |
| 5,807,629 | A | 9/1998 | Elspass et al. | |
| 5,883,173 | A | 3/1999 | Elspass et al. | |
| 5,936,023 | A | 8/1999 | Kato et al. | |
| 5,973,053 | A | 10/1999 | Usuki et al. | |
| 6,034,164 | A | 3/2000 | Elspass et al. | |
| 6,060,549 | A | 5/2000 | Li et al. | |
| 6,103,817 | A | 8/2000 | Usuki et al. | |
| 6,129,856 | A * | 10/2000 | Jung | C23C 14/046 118/723 ER |
| 6,426,135 | B1 * | 7/2002 | Kotani et al. | 428/323 |
| 6,476,154 | B1 * | 11/2002 | Maly et al. | 525/332.6 |
| 7,232,872 | B2 | 6/2007 | Shaffer et al. | |
| 7,491,764 | B2 * | 2/2009 | Dias et al. | 524/445 |
| 7,638,573 | B2 | 12/2009 | Wang et al. | |
| 7,678,855 | B2 * | 3/2010 | Ohshima | 524/495 |
| 2005/0247965 | A1 * | 11/2005 | Andideh | 257/295 |
| 2007/0037919 | A1 * | 2/2007 | Ohshima | 524/495 |
| 2007/0191533 | A1 * | 8/2007 | Ohshima | 524/494 |
| 2007/0219304 | A1 * | 9/2007 | Weng et al. | 524/445 |
| 2008/0015307 | A1 * | 1/2008 | Waddell et al. | 524/578 |
| 2008/0159947 | A1 * | 7/2008 | Yurovskaya et al. | 423/449.2 |
| 2009/0151839 | A1 * | 6/2009 | Miyasaka et al. | 152/451 |
| 2010/0036023 | A1 * | 2/2010 | Weng et al. | 524/13 |
| 2010/0233400 | A1 * | 9/2010 | Sano | 428/36.4 |
| 2010/0263778 | A1 * | 10/2010 | Lesage et al. | 152/511 |
| 2010/0324200 | A1 * | 12/2010 | Joseph et al. | 524/526 |

FOREIGN PATENT DOCUMENTS

| | | |
|---|---|---|
| WO | WO2006/085957 | 8/2006 |
| WO | WO 2007132759 A1 * | 11/2007 |

OTHER PUBLICATIONS

Akrochem (Mineral Fillers, NUCAP/NULOK/NYLOK/POLYFIL WC & WC-426, Mar. 2010, 1 page).*

Derwent Abstract for CN 101348593 (Acc No. 2009-E91614, Jan. 2009).*

Seymour (Polymer Composites: 8.18.1 Thermoplastic Elastomers. VSP BV. 1990, p. 117).*

Hamad (Engineering with Rubber: Chapter 2.32 Reinforcement, 2nd Edition, Hanser 2001, pp. 23-25 and 31, specifically p. 24).*

Malwitz, M.M. et al., "*Orientation of Platelets in Multilayered Nanocomposite Polymer Films*", Journal of Polymer Science: Part B: Polymer Physics, vol. 41, pp. 3237-3248 (2003).

"*Compounding Butyl Rubber with Thermal Carbon Black*", Cancarb Technical Bulletin No. 029, Sep. 2001, www.cancarb.com, 6 pages.

*Rubber Grade Carbon Black*, by D.T. Norman.

Fray et al., *Rubber Nanocomposites: Preparation, Properties, and Applications*, Chapter 24, (Wiley & Sons, 2010), pp. 675-696.

Soisson et al, *Vulcanization of Nanocomposite Tire Innerliner Compounds and Permeability*, Paper 112 at the PA 2009 Rubber Division, American Chemical Society meeting.

\* cited by examiner

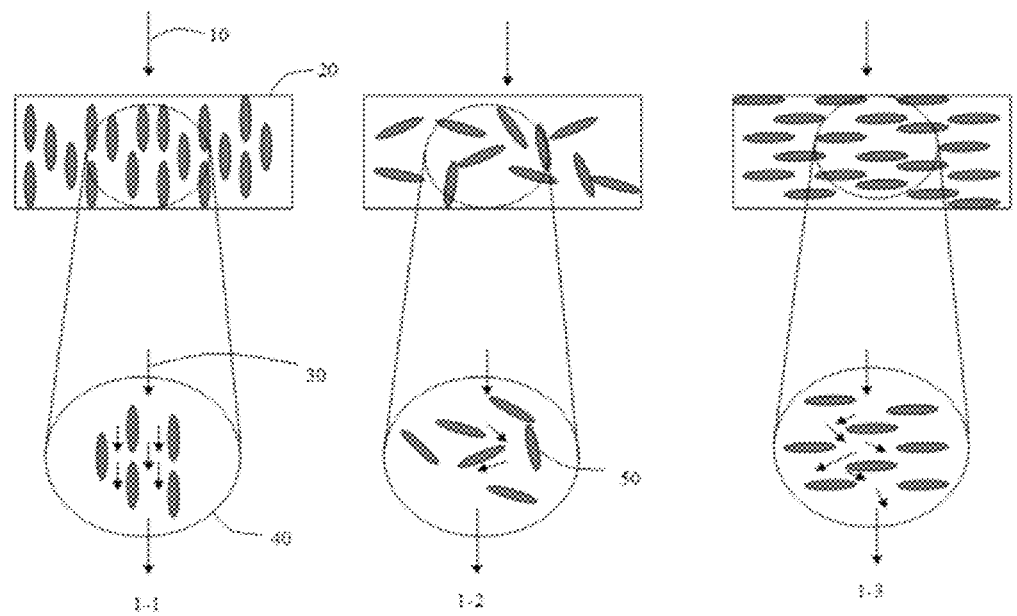
Figure 1: Orientation Patterns Of Nanoclay Platelets

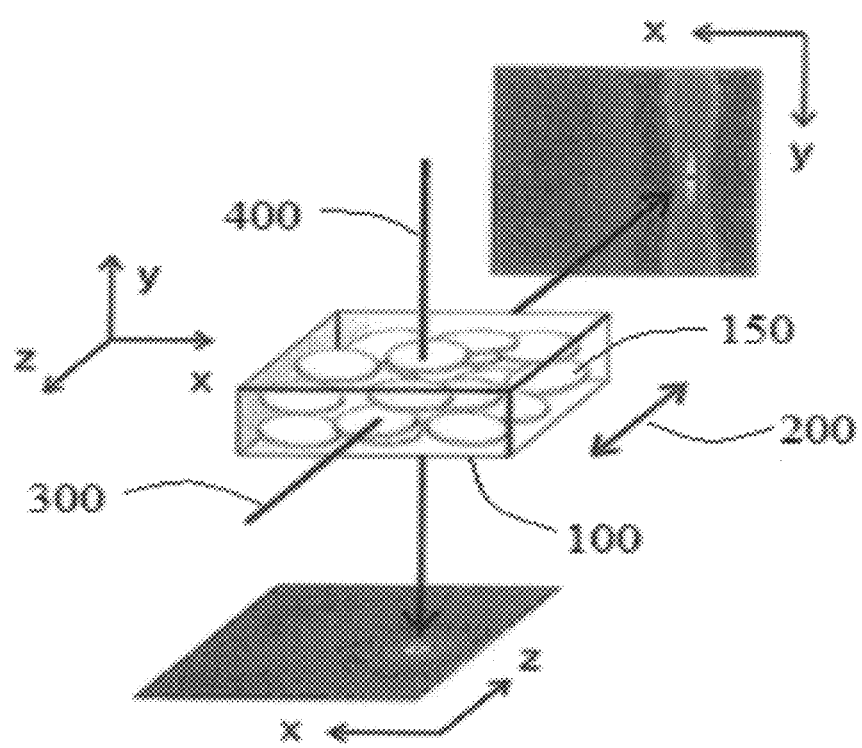
Figure 2: Determination of Orientation Of Nanoclay Platelets Using SAXS

ELASTOMERIC NANOCOMPOSITES, NANOCOMPOSITE COMPOSITIONS, AND METHODS OF MANUFACTURE

FIELD OF THE INVENTION

The present invention is related to elastomeric nanocomposites, compositions comprising the elastomeric compositions, methods of producing nanocomposites, and the use of the nanocomposites in articles. More particularly, the present invention is directed to a $C_4$ to $C_7$ isoolefin based nanocomposite having improved performance properties and blending characteristics.

BACKGROUND OF THE INVENTION

Rubbery copolymers containing a majority of isobutylene units are well known for their low gas permeability, unique damping properties, and low surface energy; these properties make such copolymers particularly desired in applications such as tire innerliners. In order to have a better compatibility or co-curability with other elastomer components in the end applications, an unsaturated comonomer and/or a comonomer containing reactive functionality is introduced into the isobutylene rubbery polymer. Previously known comonomers include, for example, isoprene and p-methylstyrene. The copolymer may be partially brominated to give better compatibility.

The tire industry has a desire to enhance the barrier property of elastomers used in inner tubes and innerliners. Elastomer nanocomposites have been developed to satisfy this need. Nanocomposites are polymer systems containing inorganic particles with at least one dimension in the nanometer range. Some examples of these are disclosed in U.S. Pat. Nos. 6,060,549; 6,103,817; 6,034,164; 5,973,053; 5,936,023; 5,883,173; 5,807,629; 5,665,183; 5,576,373; and 5,576,372. Common types of inorganic particles used in nanocomposites are phyllosilicates, an inorganic substance from the general class of so called "nanoclays." Ideally, intercalation should take place in the nanocomposite, wherein the polymer inserts into the space or gallery between the clay surfaces.

The layered clay can adapt to five different states in the base polymer. The first state is "particle dispersion" wherein the clay particle size is in the order of microns but uniformly dispersed in the base polymer. The terms aggregate and agglomerate have been used to describe this state. The second state is an "intercalated" state wherein polymer chains are inserted into the layered clay structure, this occurring in a crystallographic regular fashion, regardless of the polymer to clay ratio. Intercalated states may typically contain several layers of polymer between organoclay plates. An increase in the gallery spacing of the nanoclay, swollen with rubber, from a pristine state of about 0.3 to 0.7 nm up to about 2.0 to 6.0 nm can be considered as creating an intercalated condition. The third state is a "flocculated" state. This is conceptually the same as intercalated states; however, the individual clay layers are sometimes flocculated or aggregated due to hydroxylated edge to edge interactions of the clay layers. The fourth state is an "intercalated—flocculated" state. The clay plates in this intercalated-flocculated state can be separated; however, tactoids or agglomerates can form that have a thickness in the range of 100 to 500 nm. The fifth state is an "exfoliated" state. In an exfoliated state, the individual clay layers are separated within a continuous polymer by an average distance that depends on the clay concentration or loading in the polymer. It is therefore desirable to have exfoliation, preferably where the polymer is fully dispersed with the individual nanometer-size clay platelets.

It is also desirable to have the desired orientation of the platelets in the formulation to be perpendicular to the flow of gas. This state is particularly desirable as the regular arrangement of the platelets is thought to be effective in blocking the diffusion of gas molecules. Therefore articles containing formulations that present the clay in an exfoliated state and/or with clay platelets in the oriented perpendicular to the flow of gas are desirable. Accordingly, there is a need for formulations that present the clay in the exfoliated state and/or having an orientation perpendicular to the flow of gas, to improve barrier properties.

Additionally, in elastomeric formulations having additives of both carbon black and inorganic clays, the interaction between the polar surface groups of the carbon black and the hydrophilic nanoclays can make it challenging to achieve a good clay dispersion or exfoliation within the elastomer, or desirable orientation of the nanoclay platelets within the elastomer. Accordingly, there is a particular need to reduce the interaction between the nanofillers in elastomeric nanocomposites, to ultimately improve barrier properties.

SUMMARY OF THE INVENTION

The present invention is directed to a nanocomposite having improved capabilities for use in articles requiring impermeability features, such as tire innerliners, tire innertubes, tire curing bladders, hoses, medical stoppers, impermeability sheets, and other similar items.

Disclosed herein is a nanoclay elastomer nanocomposite comprising: (a) at least one elastomer comprising units derived from isoolefins having from 4 to 7 carbon atoms; (b) at least 10 phr of a graphitized carbon black; and (c) at least 1 phr of a nanoclay; wherein when the elastomer is compounded for use in an article, the article has a gas permeation coefficient of 80.0 c*mm/(m²·day) or less at 40° C.

Also disclosed is a method of reducing the permeability of an article comprising a nanoclay elastomer nanocomposite, the method comprising: (a) blending an elastomer comprising units derived from isoolefins having from 4 to 7 carbon atoms to obtain a polymer blend; (b) adding at least 1 phr of a nanoclay to the polymer blend; (c) adding at least 10 phr of a graphitized carbon black to the polymer blend; and (d) obtaining a nanocomposite. When the nanocomposite is compounded for use in an article, the article has a gas permeation coefficient of 80.0 c*mm/(m²·day) or less at 40° C.

Also disclosed is a method of reducing the permeability of an article comprising a nanoclay elastomer nanocomposite, the method comprising: (a) blending an elastomer comprising units derived from isoolefins having from 4 to 7 carbon atoms to obtain a polymer blend; (b) adding at least 1 phr of a nanoclay to the polymer blend; (c) thereafter, calendaring and/or extruding the polymer blend; and (d) thereby obtaining an oriented nanoclay elastomer nanocomposite having an orientation parameter, $P_2$, in the edge-on direction, of greater than 0.15.

FIGURES

FIG. 1 is a representation of exemplary orientation patterns of nanoclay platelets in an elastomer matrix.

FIG. 2 is a representation of the determination of nanoclay platelet orientation using Small Angle X-ray Scattering (SAXS).

DETAILED DESCRIPTION OF THE INVENTION

Various specific embodiments, versions, and examples of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

Definitions

Definitions applicable to the presently described invention are as described below.

Rubber refers to any polymer or composition of polymers consistent with the ASTM D1566 definition: "a material that is capable of recovering from large deformations, and can be, or already is, modified to a state in which it is essentially insoluble (but can swell) in boiling solvent." Furthermore, the rubber is an amorphous material. Elastomer is a term that may be used interchangeably with the term rubber. Elastomeric composition refers to any composition comprising at least one elastomer as defined above.

A vulcanized rubber compound, as defined by ASTM D1566, refers to "a crosslinked elastic material compounded from an elastomer, susceptible to large deformations by a small force capable of rapid, forceful recovery to approximately its original dimensions and shape upon removal of the deforming force." A cured elastomeric composition refers to any elastomeric composition that has undergone a curing process and/or comprises or is produced using an effective amount of a curative or cure package, and is a term used interchangeably with the term vulcanized rubber compound.

The term "phr" is parts per hundred rubber or "parts", and is a measure common in the art wherein components of a composition are measured by weight, relative to a total weight of all of the elastomer components. The total phr or parts for all rubber components, whether one, two, three, or more different rubber components is present in a given recipe is always defined as 100 phr. All other non-rubber components are ratioed by weight against the 100 parts of rubber and are expressed in phr. This way one can easily compare, for example, the levels of curatives or filler loadings, etc., between different compositions based on the same relative proportion of rubber without the need to recalculate percents for every component after adjusting levels of only one, or more, component(s).

"Alkyl" refers to a paraffinic hydrocarbon group which may be derived from an alkane by dropping one or more hydrogens from the formula, such as, for example, a methyl group ($CH_3$), or an ethyl group ($CH_3CH_2$), etc.

"Aryl" refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

"Substituted" refers to at least one hydrogen group being replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, isopropyl, normal butyl, isobutyl, secondary butyl, tertiary butyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-dibromobutyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted" styrenic unit includes p-methylstyrene, p-ethylstyrene, and so on.

As used herein, "wt %" means weight percent, "mol %" means mole percent, "vol %" means volume percent, and all molecular weights are in units of g/mol, unless otherwise noted.

Reducing Permeability

The tire industry has continuing need for elastomeric nanocomposites that can be used in gas barrier applications. Any improvements in technology that result in reduction of permeability may afford appreciable cost savings in production of articles useful in gas barrier applications, and impart better durability to such articles. As such, reduction in permeability is advantageous and desirable to both manufacturers and consumers of these articles.

Disclosed herein are some methods of reducing permeability. One such method is directed towards improving a nanoclay elastomer nanocomposite by adding graphitized carbon black, the method comprising: (a) blending an elastomer comprising units derived from isoolefins having from 4 to 7 carbon atoms to obtain a polymer blend; (b) adding at least 1 phr of a nanoclay to the polymer blend; (c) adding at least 10 phr of a graphitized carbon black to the polymer blend; and (d) obtaining a nanocomposite. When the elastomer is compounded for use in an article, the article has a gas permeation coefficient of 80.0 cc*mm/($m^2$·day) or less at 40° C.

The improved nanoclay elastomer nanocomposite is also described herein, the nanocomposite comprising: (a) at least one elastomer comprising units derived from isoolefins having from 4 to 7 carbon atoms; (b) at least 10 phr of a graphitized carbon black; and (c) at least 1 phr of a nanoclay; wherein the nanocomposite is compounded for use in an article, the article has a gas permeation coefficient of 80.0 cemm/($m^2$·day) or less at 40° C.

Where the improved nanoclay elastomer nanocomposites have been compounded for use in articles, the inventors have surprisingly observed that these articles have a reduced permeability, as compared to where the same nanocomposite, except that the ungraphitized form of the grade of carbon black is used in the place of the graphitized carbon black, is used.

Also disclosed is a method of reducing the permeability of an article comprising a nanoclay elastomer nanocomposite by orienting the nanoclay, the method comprising: (a) blending an elastomer comprising units derived from isoolefins having from 4 to 7 carbon atoms to obtain a polymer blend; (b) adding at least 1 phr of a nanoclay to the polymer blend; (c) thereafter, calendaring and/or extruding the polymer blend;

and (d) thereby obtaining an oriented nanoclay elastomer nanocomposite having an orientation parameter, $P_2$, in the edge-on direction, of greater than 0.15. The method may further comprise adding at least 10 phr of a graphitized carbon black to the polymer blend before step (c).

The inventors have surprisingly found that orientation of the clay improves with increased compound processing. In particular, improved orientation of the clay improves with directional compound processing, such as calendaring and/or extrusion. Improved orientation of the clay may result in reduced permeability, as described below. Additionally, use of a graphitized carbon black may reduce the nanoclay-carbon black interactions, thereby allowing a higher degree of orientation of the nanoclay platelets, as measured by the orientation parameter, $P_2$, by the directional compound processing.

Such improved nanoclay elastomer nanocomposites may be compounded for use in any article wherein impermeability is desired; such an article may be a tire innerliner, a tire innertube, a tire curing bladder, a hose, a medical stopper, an impermeability sheet, and other similar items.

Nanoclay Elastomer Nanocomposites Comprising Graphitized Carbon Black

In some embodiments herein, the nanoclay elastomer nanocomposites generally comprise: (i) at least one graphitized carbon black (GCB); (ii) at least one nanoclay; and (iii) at least one elastomer. The inventive elastomeric nanocomposites may also comprise other fillers and additives. Each of these components is described below.

(i) Graphitized Carbon Black

The inventive elastomeric nanocomposites include graphitized carbon black (GCB). GCB may be obtained from carbon black by heating the carbon black in a furnace to temperatures of 200° C. or greater, 350° C. or greater, 500° C. or greater, 800° C. or greater, 1000° C. or greater, or 2500° C. or greater for a time of at least 4 hours, at least 8 hours, at least 16 hours, at least 24 hours, or at least 36 hours. Any combination of temperature and time listed above may be used. It is also contemplated that at higher temperatures (greater than 1000° C.), less than 4 hours may be needed to graphitize the carbon black. The carbon black may be heated under a substantially inert atmosphere, such as under a nitrogen atmosphere, to form the graphitized carbon black. Grades of carbon black useful for graphitizing include the grades ranging from N110 to N990, preferably N660.

Carbon black has been used in the industry to provide reinforcement in elastomeric nanocomposites by increasing the tensile strength and modulus of the elastomeric phase, typically through the formation of a three-dimensional network by the process of vulcanization. Carbon black has an average diameter in the range of from about 10 to about 95 nm, as measured by ASTM D 3265. Particle size of the carbon black is usually inversely related to surface area. Accordingly, small particle size carbon black has a higher surface area, as measured by ASTM D 3037, than larger particle size carbon black.

Surface area and the nature of the surface tend to affect the interactive behavior of the carbon black, that is, whether it forms aggregates with itself, or with other components of the elastomeric nanocomposite. The chemical nature of the surface of carbon black tends to be variable, usually including a variety of oxygen-containing groups such as carboxyl, phenol, quinone, lactone, ketone, and/or aldehyde groups. These oxygen-containing groups render the surface of the carbon black polar and hydrophilic.

In elastomeric nanocomposites comprising carbon black and nanoclays, the inventors have observed aggregates which indicate possible association of the nanoclay and the carbon black. Without wishing to be bound by any one theory, the inventors suggest that the aggregates observed are due to interactions between the polar groups of the carbon black and the hydrophilic nanoclay surface. The inventors further suggest that the formation of these aggregates impairs the exfoliation of the nanoclay and thereby reduces effectiveness of the clay platelets in blocking the gas molecule diffusion pathway. Accordingly, the inventors suggest that the permeability of articles made using elastomeric nanocomposites comprising these aggregates may be negatively impacted.

The inventors have surprisingly found that articles made with elastomeric nanocomposites comprising GCB and nanoclays have lower gas permeation coefficients, as compared with articles made with elastomeric nanocomposites comprising the ungraphitized form of the same grade of carbon black and the same nanoclays. Without wishing to be bound by any one theory, the inventors surmise that the improved permeability observed with the use of GCB may be attributable to the removal or passivation of the polar surface groups by heating to temperatures of 200° C. or greater. The removal or passivation of surface groups of the GCB should result in the GCB having fewer polar surface groups than the ungraphitized carbon black analog, and therefore makes the surface of the GCB more hydrophobic than the ungraphitized form.

Accordingly, fewer interactions should occur between the hydrophobic surface of the GCB and the hydrophilic surface groups of the nanoclays, as compared to when the ungraphitized carbon black analog is used, which may in turn lead to the formation of fewer aggregates. Again, without wishing to be bound by this theory, the inventors attribute the improved permeability observed with elastomeric nanocomposites comprising the GCB and nanoclays to the formation of fewer aggregates and resultant better exfoliation of the nanoclays. The presence of aggregates may be determined by transmission electron microscopy (TEM), using methods known in the art.

In particular embodiments, wherein the GCB is produced by heating to a temperature of 300° C., for 8 hours, under nitrogen, the inventive elastomeric nanocomposite has at least 5% less aggregates; at least 10% less aggregates; at least 20% less aggregates; at least 40% less aggregates; at least 60% less aggregates; at least 90% less aggregates; than the same elastomeric nanocomposite where the ungraphitized form of the carbon black is used in the place of the graphitized carbon black, as measured by a TEM method.

The GCB may be used in the same conventional filler amounts for tire treads and sidewalls as for reinforcing grade ungraphitized carbon black. In embodiments herein, the GCB is present at a level of at least 10 phr, preferably in the range of from 10 to 100 phr of the blend, more preferably from 30 to 80 phr in another embodiment, and from 50 to 80 phr in yet another embodiment.

The inventors suggest that the use of GCB does not negatively impact the reinforcing properties accorded to elastomeric compositions, but instead improves the permeability properties of articles made with the inventive elastomeric nanocomposites. In embodiments herein, articles made with inventive elastomeric nanocomposites have a gas permeation coefficient of 80.0 cc*mm/[m$^2$-day] or lower at 40° C.; 75 cc*mm/[m$^2$-day] or lower; or 70 cc*mm/[m$^2$-day] or lower.

(ii) Layered Clay

To form the desired elastomeric nanocomposite, a layered clay is incorporated into the elastomeric polymer. Individual nanoclay platelet thicknesses are usually about one nanometer, but surface dimensions are generally 70 to more than 600 nanometers, resulting in an unusually high aspect ratio. This is in distinction to a fine grain carbon black that might have a very small maximum dimension but which has a low ratio of surface area to volume per grain. This high aspect ratio provides the nanoclay with a sheet-like structure. Such materials are typically agglomerated, resulting in the layered clay.

The layered clay preferably belongs to the general class of clay minerals with expanding crystal lattices commonly referred to as a "smectite" or "smectite-type clay." By way of example, this may include the dioctahedral smectites which consist of montmorillonite, beidellite, and nontronite, and the trioctahedral smectites, which includes saponite, hectorite, and sauconite. Also contemplated are synthetically prepared smectite-clays.

In yet other embodiments, the nanoclay is selected from natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The amount of clay or exfoliated clay incorporated in the elastomeric nanocomposites is generally that which is sufficient to develop an improvement in the mechanical properties or barrier properties of the elastomeric nanocomposite, for example, tensile strength or gas permeability. Amounts generally will be in the range of 0.5 to 10 wt % in one embodiment, and in the range of 1 to 5 wt % in another embodiment, based on the polymer content of the elastomeric nanocomposite. Expressed in parts per hundred rubber, the clay or exfoliated clay may be present in amounts greater than 1 phr, preferably in the range of 1 to 30 phr in one embodiment, and in the range of 5 to 20 phr in another embodiment.

For gas barrier applications, permeability is a function of the diffusion coefficient of the gas and the equilibrium absorption of the gas. Accordingly, in order to improve barrier properties and reduce permeability through formulations comprising nanoclay elastomer nanocomposites, measures to retard the flow of gas through the formulation need to be taken. These measures may include improvement of clay platelet orientation, reduction of aggregate or tactoid formation, and/or improvement of uniformity of dispersion.

Clay Platelet Orientation

In barrier applications, nanoclay platelets serve to retard the flow of gas through the formulation by increasing the path length which the gas molecules must travel. This increased path length, which retards the flow rate of gas through a nanocomposite, is referred to as the "tortuous path," and the degree of reduction of the gas flow rate, as compared to a formulation having no nanoclay present, is referred to as the degree of tortuosity. The orientation of the clay platelets within a sample of an article, such as a film, may be described relative to the direction of flow of gas, or relative to the plane of the film sample.

The clay platelets may be perpendicular to the flow of gas, parallel to the flow of gas, or randomly arranged. FIG. 1 is a representation of some possible orientations of the nanoclay platelets (50) in films 1-1, 1-2, and 1-3. The film (20) is positioned so that the film plane is perpendicular to the gas flow (10). A representative section of the film (40) is enlarged to show the passage of gas molecules (30) through the film. With respect to 1-1, the nanoclay platelets are oriented parallel to the gas flow (and perpendicular to the plane of the film sample). Articles having the nanoclay platelet orientation represented in FIG. 1, 1-1 typically have poor barrier properties and are easily permeable by gas. With respect to 1-2, the nanoclay platelets are oriented randomly with respect to the flow of gas and the film plane. Articles having the nanoclay platelet orientation represented in FIG. 1-2 typically provide intermediate barrier properties. With respect to 1-3, the nanoclay platelets are oriented perpendicular to the flow of gas, and parallel to the plane of the sample film. Articles having the nanoclay platelet orientation represented in FIG. 1-3 are optimally desired and should provide superior barrier properties, with minimal permeability.

In formulations which also comprise carbon black or GCB, the nanoclay stacks may be analyzed by use of a detection method such as Small Angle X-ray Scattering (SAXS), Wide Angle X-ray Scattering (WAXS), or Small Angle Neutron Scattering (SANS). For the purpose of the claims, SAXS was used. SAXS measurements for nanocomposite samples are taken by orienting the sample such that the beam hits it at two different angles with respect to the plane of the film, that is, in the edge-on and face-on directions, as shown in FIG. 2, described below.

FIG. 2 is a representation of the determination of orientation of the nanoclay in a formulation, using a diffraction method, such as SAXS. The formulation is in the form of a film sample (100) with the film plane (200) being in the x-z plane. The x-ray beam is directed onto sample 100 in the edge-on direction or the z plane (300) and the face-on direction or the y plane (400). The light scattering data is collected from and analyzed to give a scattering pattern for each plane. In the scattering pattern, for a pattern that is flat surface, the pattern indicates that the vector is perpendicular to the primary flat surface of the nanoclay. For a pattern that is more linear shaped, the vector is more parallel to the edge of the nanoclay; i.e. a surface normal of a non-flat surface (such as nanoclay stacks) at a point P on the surface is a vector perpendicular to the tangential plane of that surface at P.

The orientation of the platelets may also be mathematically described by an orientation parameter. Assuming that the nanoclay stacks have a cylindrical symmetry, the orientation of the nanoclays may be described by an orientation distribution function $g(\beta)$, depending on a single angle $\beta$, which is defined as the angle between the normal of the nanoclay stack and the normal of the film along the film plane. Analysis of azimuthal scans of scattered intensity SAXS analysis of sections of lamellar stacks may be carried out using a modified Onsager orientation distribution function ($g(\beta)$), represented by Formula 1, below.

$$g(\beta) = p_0 + (1-p_0) * (p/\sin hp) * (\cos h(p \cos \beta)) \quad \text{Formula 1}$$

where $\beta$ is as defined above;

p relates to the width of the orientation distribution of the nanoclay stacks in the system, and typically p is 0 or greater (the higher the p value, the higher the degree of orientation relative to the film plane). For isotropic systems, p is 0, and $p_0$ represents an isotropic contribution, $p_0$ ranges from 0 to 1.0.

The extent of the preferred orientation of these organoclay stacks can be calculated using Herman's orientation parameter ($P_2$), represented by Formula 2, below.

$$\overline{P}_2 = 0.5 * \left[ 3 * \int_0^{\pi/2} g(\beta) \cos^2(\beta) \sin(\beta) d\beta - 1 \right] \quad \text{Formula 2}$$

where β is as defined above; and g(β) is the modified Onsanger orientation distribution as defined above.

$P_2$ represents the orientation distribution of the nanoclay platelets within the sample, relative to the plane of the sample, and ranges from about −0.5 to about 1. The nanoclay platelets are considered aligned parallel to the plane of the film where $P_2=1$, such as in FIG. 1-3. The nanoclay platelets are considered perpendicular to the plane of the film sample where $P_2=-0.5$, such as in FIG. 1-1, and randomly arranged where $P_2=0$, such as in FIG. 1-2.

A relationship can also be established between the orientation of the nanoclay with the wt % of nanoclay added as a nanofiller to the elastomer. Three dimensional modeling of nanoclay stacks in these nanocomposites can be carried out and the extent of orientation expressed as the Herman's orientation parameter, as shown in Formula 3, below.

$$P_2 = (1-p_0)(1-3p^{-1}[\cot h(p)-p^{-1}])\qquad\text{Formula 3}$$

where p relates to the width of the orientation distribution of the nanoclay stacks in the system, and typically p is 0 or greater (the higher the p value, the higher the degree of orientation relative to the film plane). For isotropic systems, p is 0, and $p_0$ represents an isotropic contribution, $p_0$ ranges from 0 to 1.0.

For gas barrier applications, the desired orientation of the clay platelets within the formulation is such that their longest dimension is perpendicular to the flow of gas, thereby increasing the path length which the gas molecules must travel, as shown in FIG. 1, 1-3. This orientation results in the highest tortuosity. Therefore, in embodiments herein the orientation parameter, $P_2$, in the edge-on direction, is greater than 0, greater than 0.5, greater than 0.15, greater than 0.25, greater than 0.50, greater than 0.75, and most preferably, $P_2$ is 1.0.

However, this desired orientation is often difficult to achieve due to re-aggregation of the clay platelets and association of the platelets with other materials, such as carbon black, in a compounded nanocomposite. Any deviation from this preferred orientation, that is, where the nanoclay platelet orientation is not parallel to the film plane, may lead to a negative impact on barrier properties. The inventors have advantageously found that the nanoclay-carbon black interactions may be reduced by the use of GCB. The inventors further suggest that compounding with GCB instead of the ungraphited carbon black may improve the $P_2$, and ultimately improve the barrier properties of the article. Even further, the inventors have found that directional processing of the compounded material improves the $P_2$, and may ultimately improve the barrier properties of the article.

Modifying or Exfoliating Additives

The layered clays described above may be modified by intercalation or exfoliation by at least one agent, additive, or surfactant capable of undergoing ion exchange reactions with the anions present at the interlayer surfaces of the layered filler to render the clay more hydrophobic. The agents, additives, or surfactants are selected for their capability of undergoing ion exchange reactions with the anions present at the interlayer surfaces of the layered filler. Suitable compounds are cationic surfactants, preferably quaternary ammonium, in which at least two higher molecular weight group and up to two lower molecular weight groups are linked to the nitrogen.

Suitable quaternary ammoniums include, but are not limited to, benzyl trialkyl ammonium, methyl benzyl dialkyl ammonium, methyl benzyl di-hydrogenated tallow ammonium, dimethyl benzyl hydrogenated tallow ammonium, dimethyl ditallow, and dibenzyl dialkyl ammonium.

Examples of suitable modifying additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. For example, amine compounds (or the corresponding ammonium ion) are those with the structure $R^2R^3R^4N$, wherein $R^2$, $R^3$, and $R^4$ are $C_1$ to $C_{30}$ alkyls or $C_2$ to $C_{30}$ alkenes in one embodiment, $C_1$ to $C_{20}$ alkyls or $C_2$ to $C_{20}$ alkenes in another embodiment, which may be the same or different. In one embodiment, the exfoliating additive is a long chain tertiary amine, wherein at least $R^2$ is a $C_{14}$ to $C_{20}$ alkyl or alkene.

In particular embodiments, the layered clays may contain a benzyl functionality which provides for improvement in the separation of the clay layers in the polymer, thereby improving the impermeability of the elastomeric nanocomposite, as described in U.S. application Ser. No. 12/851,264. Thus one of the lower molecular weight groups linked to the quaternary ammonium is a benzyl derived unit. The ammonium may be structurally described as follows:

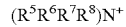

wherein $R^5$ is benzyl derived unit, which may or may not be substituted, wherein $R^6$ is selected from $C_1$ to $C_{26}$ alkyls, $C_2$ to $C_{26}$ alkenes, and $C_3$ to $C_{26}$ aryls, and wherein $R^7$ and $R^8$ are the same or different and are independently selected from $C_9$ to $C_{26}$ alkyls, $C_9$ to $C_{26}$ alkenes, and $C_9$ to $C_{26}$ aryls.

In other embodiments, a class of exfoliating additives includes those which can covalently bond to the interlayer surfaces. These include polysilanes of the structure —Si(R$^9$)$_2$R$^{10}$ where R$^9$ is the same or different at each occurrence and is selected from alkyl, alkoxy or oxysilane and R$^{10}$ is an organic radical compatible with the matrix polymer of the composite. Other suitable exfoliating additives include protonated amino acids and salts thereof containing 2-30 carbon atoms such as 12-aminododecanoic acid, epsilon-caprolactam and like materials.

In a particular embodiment, the exfoliating additive or additives are capable of reacting with the halogen sites of the halogenated elastomer to form complexes which help exfoliate the clay. In certain embodiments, the additives include all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

In yet other embodiments, modifying additives include at least one polymer chain comprising a carbon chain length of from $C_{25}$ to $C_{500}$, wherein the polymer chain also comprises an ammonium-functionalized group, pendant to the polymer chain E, as indicated

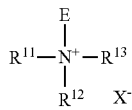

wherein each $R^{11}$, $R^{12}$ and $R^{13}$ are the same or different, t and independently selected from hydrogen, $C_1$ to $C_{26}$ alkyl, alkenes or aryls, substituted $C_1$ to $C_{26}$ alkyls, alkenes or aryls, $C_1$ to $C_{26}$ aliphatic alcohols or ethers, $C_1$ to $C_{26}$ carboxylic acids, nitriles, ethoxylated amines, acrylates and esters; and wherein X⁻ is a counterion of ammonium such as Br⁻, Cl⁻ or (PF$_6$)⁻.

The modifying agent may be present in the composition in an amount to achieve optimal air retention as measured by the permeability testing. For example, the additive may be employed in the range of 0.1 to 40 phr in one embodiment, and in the range of 0.2 to 20 phr in another embodiment, and in the range of 0.3 to 10 phr in yet another embodiment.

The modifying agent may be added as an additive to the composition at any stage; for example, the additive may be added to the elastomer, followed by addition of the layered clay, or may be added to a combination of at least one elastomer and at least one layered clay; or the additive may be first blended with the layered clay, followed by addition of the elastomer in yet another embodiment.

(iii) Elastomers

Preferred elastomers useful in the practice of this invention include polymers of $C_4$ to $C_7$ isoolefin monomers. These polymers may be homopolymers or copolymers. In some embodiments, the polymers of $C_4$ to $C_7$ isoolefin monomers include a) copolymers derived from at least one $C_4$ to $C_7$ isoolefin monomer and at least one multiolefin monomer and/or b) homopolymers of $C_4$ to $C_7$ isoolefin monomers. Such polymers are conventionally referred to as butyl rubbers. For the copolymers, the isoolefin derived content in the copolymer is in the range of from 70 to 99.5 wt %; or from about 85 to 99.5 wt %; based on the weight of the total monomer derived units. The multiolefin derived content in the copolymer is present in the range of from 30 to 0.5 wt %; from 15 to 0.5 wt %; or from 8 to 0.5 wt %.

The $C_4$ to $C_7$ isoolefin may be selected from compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in U.S. Pat. Nos. 5,506,316 and 5,162,425. Other polymerizable monomers such as styrene and dichlorostyrene are also suitable for homopolymerization or copolymerization in butyl rubbers.

When the isoolefin is isobutylene, the elastomers may be referred to as "an isobutylene based elastomer" and refers to an elastomer or a polymer comprising at least 70 mol % isobutylene derived units. One embodiment of the isobutylene based butyl rubber polymer useful in the invention is obtained by reacting 92 to 99.5 wt % of isobutylene with 0.5 to 8 wt % isoprene, or 95 to 99.5 wt % isobutylene with 0.5 wt % to 5.0 wt % isoprene in yet another embodiment.

The elastomer in a desirable embodiment of the invention is halogenated, preferably with chlorine or bromine. Halogenated butyl rubber is produced by the halogenation of any of the butyl copolymers described above. Halogenation can be carried out by any means, and the invention is not herein limited by the halogenation process. The halogen wt % is from 0.1 to 10 wt % based in on the weight of the halogenated butyl rubber in one embodiment, and from 0.5 to 5 wt % in another embodiment. In yet another embodiment, the halogen wt % of the halogenated butyl rubber is from 1.0 to 2.5 wt %.

In accordance with the another embodiment of the present invention, the copolymer is a random copolymer comprising a $C_4$ to $C_7$ isoolefins derived units and alkylstyrene derived units, the copolymer containing at least 85 wt %, more alternatively at least 86.5 wt % of the isoolefin units, about 8 to about 12 wt % alkylstyrene units, and about 1.1 to about 1.5 wt % of a halogen. In one embodiment, the polymer may be a random elastomeric copolymer of a $C_4$ to $C_7$ α-olefin and a methylstyrene containing at about 8 to about 12% by weight methylstyrene, and 1.1 to 1.5 wt % bromine or chlorine. Exemplary materials may be characterized as polymers containing the following monomer units randomly spaced along the polymer chain:

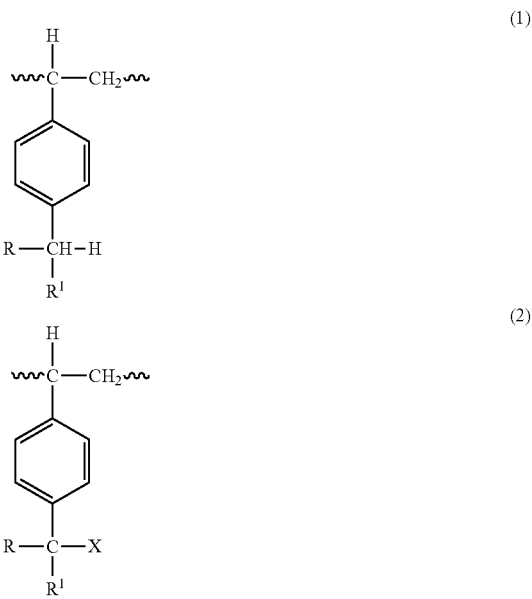

wherein R and R¹ are independently hydrogen, lower alkyl, such as a $C_1$ to $C_7$ alkyl and primary or secondary alkyl halides and X is a halogen. In one embodiment, R and R¹ are each hydrogen.

Up to 25 mol % of the total alkyl substituted styrene [the total of structures (1) and (2)] present in the random polymer structure may be the halogenated alkyl substituted structure (2) above in one embodiment, and in another embodiment from 10 to 25 mol %. In yet another embodiment, the amount of functionalized structure (2) in the random copolymer itself is from about 0.8 to about 1.10 mol %.

In one embodiment the elastomer comprises a random copolymer of isobutylene and para-methylstyrene containing from about 5 to about 10 wt % para-methylstyrene. From about 17% to about 40% of the methyl groups on the para-methylstyrene comonomers may be brominated ("BIMSM" or Brominated Isobutylene para-Methyl Sytrene rubber, the "M" denoting the polymer chain is saturated, as described in ISO1629).

In another embodiment, the functionality is selected such that it can react or form polar bonds with functional groups present in the matrix polymer, for example, acid, amino or hydroxyl functional groups, when the polymer components are mixed at high temperatures.

In certain embodiments, the random copolymers have a substantially homogeneous compositional distribution such that at least 95 wt % of the polymer has a para-alkylstyrene content within 10% of the average para-alkylstyrene content of the polymer. Exemplary polymers are characterized by a narrow molecular weight distribution (Mw/Mn) of less than 4.0, alternatively less than 2.5. The copolymers have an exemplary viscosity average molecular weight in the range of from 400,000 up to 2,000,000 and an exemplary number average molecular weight in the range of from 100,000 to 750,000 as determined by gel permeation chromatography.

In some embodiments, the polymer is a copolymer having a substantially homogeneous compositional distribution and comprising from about 8 to about 12 wt % of alkylstyrene moieties and from about 1.1 to about 1.5 wt % of a halogen and having a Mw/Mn of less than about 6.

The random copolymer discussed above may be prepared via slurry polymerization, typically in a diluent comprising a halogenated hydrocarbon(s) such as a chlorinated hydrocarbon and/or a fluorinated hydrocarbon (see U.S. Pat. No. 7,232,872), using a Lewis acid catalyst and optionally a catalyst initiator, followed by optional halogenation, preferably bromination, in solution in the presence of the halogen and a radical initiator such as heat and/or light and/or a chemical initiator and, optionally, followed by electrophilic substitution of the halogen with a different functional moiety.

In an embodiment, halogenated poly(isobutylene-co-p-methylstyrene) polymers generally contain from about 0.8 to about 1.1 mol % of halo-methylstyrene groups relative to the total amount of monomer derived units in the copolymer. In another embodiment, the amount of halo-methylstyrene groups is from 0.80 to 1.10 mol %, and from 0.80 to 1.00 mol % in yet another embodiment, and from 0.85 to 1.1 mol % in yet another embodiment, and from 0.85 to 1.0 mol % in yet another embodiment, wherein a desirable range may be any combination of any upper limit with any lower limit. Expressed another way, the copolymers of the present invention contain from about 1.1 to about 1.5 wt % of halogen, based on the weight of the polymer, from 1.1 to 1.5 wt % halogen in another embodiment, and from 1.15 to 1.45 wt % in another embodiment. In a preferred embodiment, the halogen is either bromine or chlorine; in a most preferred embodiment, the halogen is bromine.

In another embodiment, the copolymers are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer from about 10 to about 22 mol % based on the total number of para-methylstyrene, and wherein the para-methylstyrene derived units are present from 8 to 12 wt % based on the total weight of the polymer in one embodiment, and from 9 to 10.5 wt % in another embodiment. In another embodiment, the para-(halomethylstyrene) is para-(bromomethylstyrene).

Other $C_4$ to $C_7$ isoolefin derived unit containing elastomers suitable for use in the present invention include polymers comprising the isoolefin and at least two multiolefins wherein the multiolefins have different backbone structures prior to polymerization. Such polymers include both block and random polymers of $C_4$ to $C_8$ isoolefin derived units, $C_4$ to $C_{14}$ multiolefin derive units, and alkylstyrene derived units. One such polymer may be formed from isobutylene, isoprene, and alkylstyrene, preferably methylstyrene, monomers. Another suitable polymer may be polymerized from isobutylene, cyclopentadiene, and alkylstyrene monomers. Such polymers are obtained under cationic polymerization conditions.

Methods of Reducing Permeability

Disclosed herein is a method of reducing the permeability of an article comprising a nanoclay elastomer nanocomposite, the method comprising: (a) blending an elastomer comprising units derived from isoolefins having from 4 to 7 carbon atoms to obtain a polymer blend; (b) adding at least 1 phr of a nanoclay to the polymer blend; (c) adding at least 10 phr of a graphitized carbon black to the polymer blend; and (d) obtaining a nanocomposite. When the nanocomposite is compounded for use in an article, the article has a gas permeation coefficient of 80.0 cc*mm/(m$^2$·day) or less at 40° C. In some embodiments, the article has an orientation parameter $P_2$ of greater than 0.15.

Also disclosed is a method of reducing the permeability of an article comprising a nanoclay elastomer nanocomposite by orienting the nanoclay, the method comprising: (a) blending an elastomer comprising units derived from isoolefins having from 4 to 7 carbon atoms to obtain a polymer blend; (b) adding at least 1 phr of a nanoclay to the polymer blend; (c) thereafter, calendaring and/or extruding the polymer blend; and (d) thereby obtaining an oriented nanoclay elastomer nanocomposite having an orientation parameter $P_2$ in the edge-on direction, of greater than 0.15. The method may further comprise adding at least 10 phr of a GCB to the polymer blend before step (c).

In embodiments herein, the nanoclay elastomer nanocomposite is formed completely by, or by a combination of, melt blending, solution blending, and emulsion blending. However, by no means are these processes exhaustive of possible nanocomposite production processes.

Melt Blending

The elastomeric nanocomposite of the present invention can be formed by a polymer melt blending process. Blending of the components can be carried out by combining the polymer components, the clay in the form of an intercalate, and the GCB in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the elastomeric nanocomposite. Following dispersion and exfoliation of the clay into the elastomer, the GCB is added to the mixer for a period of time sufficient to allow adequate dispersion of the GCB into the elastomeric mixture. The nanoclay elastomer nanocomposite may then be further compounded in the mixer, in accordance with conventional elastomeric mixing techniques known to those skilled in the art.

Emulsion Blending

The mixture of clay and elastomer, prior to inclusion of a GCB, may be prepared via an emulsion process. In the emulsion process, an aqueous slurry of inorganic clay is mixed with a polymer dissolved in a solvent (cement). The mixing should be sufficiently vigorous to form emulsions or microemulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a elastomeric nanocomposite is produced by a process comprising contacting Solution A comprising water, at least one layered clay, with Solution B comprising a solvent and at least one elastomer; and removing the solvent and water from the contact product of Solution A and Solution B to recover a elastomeric nanocomposite. In certain embodiments, the emulsion is formed by subjecting the mixture to agitation using a high-shear mixer.

In some embodiments, a nanocomposite is produced by a process comprising contacting Solution A comprising water, at least one layered clay, with Solution B comprising a solvent and at least one elastomer, wherein the contacting is performed in the presence of an emulsifier or surfactant.

The emulsions are formed by subjecting a mixture of the hydrocarbon, water and surfactant when used, to sufficient shearing, as in a commercial blender or its equivalent for a period of time sufficient for forming the emulsion, e.g., generally at least a few seconds. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 wt % of the total emulsion, more preferably about 0.001 to about 3 wt %, and most preferably 0.01 to less than 2 wt %.

Cationic surfactants useful in preparing the emulsions of this invention include tertiary amines, diamines, polyamines, amines, as well as quaternary ammonium compounds. Nonionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

Solution Blending

The elastomer and the clay may also be mixed via a solution blending process to obtain an initial exfoliation of the clay in the elastomer. In this solution process, a nanocomposite is produced by contacting Solution A comprising a hydrocarbon solvent and at least one layered clay, with Solution B comprising a solvent and at least one elastomer, and removing the solvents from the contact product of Solution A and Solution B to form a nanocomposite.

The layered nanofiller may be a layered clay treated with organic molecules as described above. In yet another embodiment, a nanocomposite is produced by a process comprising contacting at least one elastomer and at least one layered clay in a solvent; and removing the solvent from the contact product to form a nanocomposite.

In another embodiment, a nanocomposite is produced by a process comprising contacting at least one elastomer at least one layered clay in a solvent mixture; and removing the solvent mixture from the contact product to form a nanocomposite.

In another embodiment, a nanocomposite is produced by a process to form a contact product comprising dissolving at least one elastomer and then dispersing at least one layered clay in a solvent or a solvent mixture; and removing the solvent mixture from the contact product to form a nanocomposite. In yet another embodiment, a nanocomposite is produced by a process to form a contact product comprising dispersing at least one layered clay, and then dissolving at least one elastomer in a solvent or solvent mixture; and removing the solvent mixture from the contact product to form a nanocomposite.

In the embodiments described above, solvents may be present in the production of the nanocomposite composition from 30 to 99 wt %, alternatively from 40 to 99 wt %, alternatively from 50 to 99 wt %, alternatively from 60 to 99 wt %, alternatively from 70 to 99 wt %, alternatively from 80 to 99 wt %, alternatively from 90 to 99 wt %, alternatively from 95 to 99 wt %, based upon the total wt of the composition.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %.

Suitable solvents include hydrocarbons such as alkanes, including $C_4$ to $C_{22}$ linear, cyclic, branched alkanes, alkenes, aromatics, and mixtures thereof. Examples include propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and mixtures thereof.

In another embodiment, suitable solvents include one or more nitrated alkanes, including $C_2$ to $C_{22}$ nitrated linear, cyclic or branched alkanes. Nitrated alkanes include, but are not limited to nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above, and mixtures thereof.

In another embodiment, suitable solvents include at least one oxygenate, including $C_1$ to $C_{22}$ alcohols, ketones, ethers, carboxylic acids, esters, and mixtures thereof. Other suitable solvents are further described in WO 2006/085957.

Halogenated versions of all of the above may also be used such as chlorinated hydrocarbons, for example, methyl chloride, methylene chloride, ethyl chloride, propyl chloride, butyl chloride, chloroform, and mixtures thereof.

In fully formulated compounds, when using an emulsion or solution process to mix the copolymer and the nanoclay which yields a preblended nanocomposite elastomer, the amount of based elastomer, the nanocomposite, is expressed in parts per hundred nanocomposite (phn). The nanocomposite will be prepared to have a defined clay loading amount.

When using either the emulsion and solution process, after the elastomeric nanocomposite is recovered, the carbon black is added during blending of the elastomer with, before, or after other compounding additives are added to the blend; with the caveat that carbon black is added prior to the addition of any curatives to the blend.

Compounding Additives

The elastomeric nanocomposite may be blended with additional components to achieve a fully compounded elastomer. Possible additional components includes conventional fillers, nanofillers, processing aids and oils, and cure additives.

Conventional elastomeric fillers are, for example, calcium carbonate, silica, non-organic clay, talc, titanium dioxide, and ungraphitized carbon black. One or more of the fillers may be used. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

Other Fillers and Additives

The elastomeric compositions of the present invention may also contain other components and additives customarily used in rubber compounds, such as, for example, effective amounts of other processing aids, pigments, accelerators, cross-linking and curing materials, antioxidants, and antiozonants. For example, elastomeric compositions may optionally include other useful processing aids such as, for example, plastomers, polybutenes, or mixtures thereof.

In addition to comprising at least one elastomer, the elastomeric compositions may also optionally comprise at least one filler, for example, calcium carbonate, mica, silica, silicates, talc, titanium dioxide, aluminum oxide, zinc oxide, starch, wood flour, ungraphitized carbon black, or mixtures thereof. The fillers may be any size and are typically are in the range of about 0.0001 μm to about 100 μm in the tire industry.

As used herein, silica is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica or highly dispersible silica.

Crosslinking Agents, Vulcanization Additives, and Curing Processes

Generally, polymer blends, for example, those used to produce tires, are crosslinked thereby improve the polymer's mechanical properties. It is known that the physical properties, performance characteristics, and durability of vulcanized rubber compounds are directly related to the number (crosslink density) and type of crosslinks formed during the vulcanization reaction.

In certain embodiments of the present invention, the elastomeric compositions and the articles made from those compositions may comprise at least one vulcanization additive or crosslinking agent to enable the elastomer to undergo a process to cure the elastomeric composition. As used herein, a vulcanization additive or package refers to any material or method capable of imparting vulcanized properties to a rubber as commonly understood in the industry. A vulcanization package or system may include at least one of the following.

Suitable components include sulfur, metal oxides, organometallic compounds, and radical initiators. Peroxide vulcanization systems or resin vulcanization systems may also be used. However, if the elastomer is being combined with a thermoplastic to form a DVA (where no cross-linking of the thermoplastic is desired), the use of peroxide vulcanization additive may be avoided if the thermoplastic resin is one such that the presence of peroxide would cause the thermoplastic resin to cross-link.

Sulfur is the most common chemical vulcanizing agent for diene-containing elastomers. It exists as a rhombic eight member ring or in amorphous polymeric forms. A typical sulfur vulcanization system consists of the accelerator to activate the sulfur, an activator, and a retarder to help control the rate of vulcanization. The accelerator serves to control the onset of and rate of vulcanization, and the number and type of sulfur crosslinks that are formed. Activators may also be used in combination with the vulcanization additive and accelerator. The activator reacts first with the accelerators to form rubber-soluble complexes which then react with the sulfur to form sulfurating agents. General classes of activators include amines, diamines, guanidines, thioureas, thiazoles, thiurams, sulfenamides, sulfenimides, thiocarbamates, xanthates, and the like. Retarders may be used to delay the initial onset of cure in order to allow sufficient time to process the unvulcanized rubber.

When the elastomer contains halogen, such as in the embodiment comprising halogenated poly(isobutylene-co-p-methylstyrene), the elastomer may be crosslinked via the halogen reaction with metal oxides. The metal oxide is thought to react with halogen groups in the polymer to produce an active intermediate which then reacts further to produce carbon-carbon bonds. Metal halides are liberated as a by-product and can serve as autocatalysts for this reaction. Common vulcanization additives include ZnO, CaO, MgO, $Al_2O_3$, $CrO_3$, FeO, $Fe_2O_3$, and NiO. These metal oxides can be used alone or in conjunction with the corresponding metal fatty acid complex (e.g., the stearate salts of Zn, Ca, Mg, and Al), or with stearic acid and either a sulfur compound or an alkylperoxide compound.

One or more crosslinking agents are preferably used in the elastomeric compositions of the present invention, especially when silica is the primary filler, or is present in combination with another filler. In particular embodiments, one or more silane coupling agents are used in the elastomeric compositions. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane, gamma-mercaptopropyltrimethoxysilane and the like, and mixtures thereof. In a particular embodiment, bis-(3-triethoxysilypropyl)tetrasulfide is employed.

The mechanism for accelerated vulcanization of elastomers involves complex interactions between the curative, accelerator, activators and polymers. Ideally, all available vulcanization additive is consumed in the formation of effective crosslinks which join together two polymer chains and enhance the overall strength of the polymer matrix. Numerous accelerators are known in the art and include, but are not limited to, the following: stearic acid, diphenyl guanidine, tetramethylthiuram disulfide, 4,4'-dithiodimorpholine, tetrabutylthiuram disulfide, benzothiazyl disulfide, hexamethylene-1,6-bisthiosulfate disodium salt dihydrate (sold commercially as DURALINK™ HTS by Flexsys), 2-morpholinothio benzothiazole (MBS or MOR), blends of 90% MOR and 10% MBTS (MOR 90), N-tertiarybutyl-2-benzothiazole sulfenamide, and N-oxydiethylene thiocarbamyl-N-oxydiethylene sulfonamide, zinc 2-ethyl hexanoate, and thioureas.

Elastomeric compositions typically contain other components and additives customarily used in rubber mixes, such as effective amounts of other nondiscolored and nondiscoloring processing aids, processing oils, pigments, antioxidants, and/or antiozonants.

Secondary Polymers

In one embodiment, the elastomeric nanocomposite as discussed above may be the sole elastomeric component of a compound; thereby taking full advantage of the above noted benefits. Alternatively in other embodiments, the inventive nanocomposite may be blended with a different/secondary polymer to obtain a compound having desired properties or characteristics.

In some embodiments, the secondary polymer is an elastomeric polymer. Examples of secondary elastomeric polymers include natural rubbers (NR), polybutadiene rubber (BR), polyisoprene rubber (IR), poly(styrene-co-butadiene) rubber (SBR), poly(isoprene-co-butadiene) rubber (IBR), styrene-isoprene-butadiene rubber (SIBR), ethylene-propylene rubber (EPM), ethylene-propylene-diene rubber (EPDM), and mixtures thereof.

In other embodiments, the nanocomposite is blended with a thermoplastic polymer selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly(phenylene ether), and mixtures thereof, to form a polymer blend or composition. Preferably the nanocomposite and the thermoplastic polymer are dynamically vulcanized together.

When blended in a polymer blend, the secondary polymer, either individually or as a blend of different polymers (i.e., reactor blends, physical blends such as by melt mixing), may be present in the composition from 10 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

Such secondary polymers may be present in the final composition in amounts ranging from 5 to 90 phr. To obtain a greater impermeability, the use of polymers having lesser permeability characteristics will be limited to minor amounts, i.e., less than 50 phr, in the polymer blend.

The polymer composition may then be extruded and/or calendered. The extrusion and/or calendering may occur using any extruders and/or calender configurations known in the art, as long as the nanoclay achieves the desired orientation parameter, $P_2$.

For example, the polymer composition may be extruded through a hot feed extrusion system, a cold extrusion system, or a combination thereof. The polymer composition may be calendered using a calender system, as known in the art. The calenders may be of varying configurations, with varying complexity. In particular embodiments, the liner compound is transferred to the calender by extruder.

Without wishing to be bound by theory, the inventors suggest that during the mixing processes outlined above (melt, solution, and emulsion), the clay is thought to undergo exfoliation. This exfoliation may reduce the clay-clay interactions, thereby synergistically priming the individual platelets for advantageous orientation. On heating, and with the application of shear forces during the extrusion and/or calendering process, the clay platelets may become advantageously oriented with their surface normal perpendicular to the plane of the extruded and/or calendered sheet. Furthermore, where GCB is used, the interactions between the GCB and the clay platelets may be reduced, allowing for better nanoclay platelet exfoliation, optimal orientation, thereby ultimately improving barrier properties.

Industrial Applicability

Embodiments of the present invention preferably have a gas permeation coefficient of 80.0 cc*mm/[m$^{2-}$ day] or lower at 40° C. as measured on articles or cured nanocomposite compositions, as described herein. Alternatively, the gas permeation coefficient may be 75 cc*mm/[m$^2$-day] or lower at 40° C., 70 cc*mm/[m$^2$-day] or lower at 40° C., as measured on articles or cured nanocomposite compounds as described herein.

Permeation of a gas or permeability though a membranous article such as tire innerliner consists of three distinct processes. First, the gas molecules must dissolve on one side of the membrane, then diffuse across the membrane or liner to the opposite side of lower gas concentration, the rate being dependent on the size of the diffusion gradient, and then evaporate or disperse in the adjacent tire component or other medium. The size of oxygen and nitrogen molecules is 2.9 and 3.1 Angstroms respectively; the activation energy of diffusion is reported to be 49.8 and 50.6 KJ/mol respectively for oxygen and nitrogen. These values clearly suggest that oxygen diffuses more readily than nitrogen, and permeability values for oxygen will be higher than for nitrogen.

The invention, accordingly, provides the following embodiments:

1. A nanocomposite comprising:
   (a) at least one elastomer comprising units derived from isoolefins having from 4 to 7 carbon atoms; preferably wherein the polymer is a copolymer comprising units derived from $C_4$ to $C_7$ isoolefins and at least one multiolefin; optionally the polymer is halogenated with either chlorine or bromine; alternatively the polymer is a copolymer having a substantially homogeneous compositional distribution and comprising from about 8 to about 12 wt % of alkylstyrene moieties and from about 1.1 to about 1.5 wt % of a halogen and having a Mw/Mn of less than about 6;
   (b) at least 10 phr of a graphitized carbon black; preferably from 10 to 100 phr; from 30 to 80 phr; from 50 to 80 phr; or 60 phr; in one embodiment, the carbon black was heated to a temperature of 200° C. or greater, 350° C. or greater, 500° C. or greater, 800° C. or greater, 1000° C. or greater, or 2500° C. or greater, for a time of at least 4 hours, at least 8 hours, at least 16 hours, at least 24 hours, or at least 36 hours, optionally under a substantially inert atmosphere, preferably under nitrogen, to provide the graphitized carbon black;
   (c) at least 1 phr of a nanoclay; preferably from 1 to 50 phr; from 5 to 20 phr; from 5 to 10 phr; 5 phr or 10 phr; preferably wherein the nanoclay is selected from montmorillonite, nontronite, beidellite, bentonite, volkonskoite, laponite, hectorite, saponite, sauconite, magadite, kenyaite, stevensite, vermiculite, halloysite, aluminate oxides, hydrotalcite, and mixtures thereof; and
   (d) optionally, a secondary polymer; preferably wherein the secondary elastomeric polymer is selected from the group consisting of natural rubbers, polybutadiene rubber, polyisoprene rubber, poly(styrene-co-butadiene) rubber, poly(isoprene-co-butadiene) rubber, styrene-isoprene-butadiene rubber, ethylene-propylene rubber, ethylene-propylene-diene rubber, and mixtures thereof;
   (e) optionally, at least one component selected from the group consisting of fillers, processing oils, and cure additives; and
   wherein when the nanocomposite is used in an article, the article has a gas permeation coefficient of 80.0 cc*mm/[m$^2$-day] at 40° C., 75 cc*mm/[m$^2$-day] or lower, or 70 cc*mm/[m$^2$-day] or lower.

2. The nanocomposite of paragraph 1, wherein the alkylstyrene is para-methylstyrene and the isoolefin comprises isobutylene; preferably wherein the alkylstyrene is functionalized with the halogen, and up to 25 mol % of the alkylstyrene is so functionalized; even more preferably wherein from 10 to 25 mol % of the alkylstyrene is functionalized by the halogen.

3. The nanocomposite of paragraphs 1 and 2, wherein the nanocomposite is blended with a thermoplastic polymer selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly (phenylene ether), and mixtures thereof; preferably the nanocomposite and the thermoplastic polymer are dynamically vulcanized together.

4. An article comprising the nanocomposite of paragraphs 1 to 3; preferably wherein the article has an absolute oxygen permeation rate of 0.5 to 20% less, 3 to 15% less, 4 to 10% less, than the same article where the ungraphitized form of the carbon black is used in the place of the graphitized carbon black, wherein the graphitized carbon black is produced by heating to a temperature of 248° C. for 8 hours, under nitrogen.

5. The article of paragraph 4, wherein the article is an innerliner or a film.

6. A method of reducing permeability of an article, where the improved article is the article of paragraphs 4 and 5, or the improved article comprises the elastomeric nanocomposite of paragraphs 1 to 3, the method comprising:
(a) obtaining a polymer comprising units derived from isoolefins having from 4 to 7 carbon atoms to obtain a polymer blend; preferably wherein the polymer is a copolymer comprising units derived from at least one $C_4$ to $C_7$ isoolefin and at least one multiolefin; optionally the polymer is halogenated with either chlorine or bromine; preferably the polymer is a copolymer having a substantially homogeneous compositional distribution and comprising from about 8 to about 12 wt % of alkylstyrene moieties and from about 1.1 to about 1.5 wt % of a halogen and having Mw/Mn of less than about 6;
(b) adding at least 1 phr of a nanoclay to the polymer; preferably from 1 to 50 phr; from 5 to 20 phr; from 5 to 10 phr; 5 phr or 10 phr; preferably wherein the nanoclay is selected from montmorillonite, nontronite, beidellite, bentonite, volkonskoite, laponite, hectorite, saponite, sauconite, magadite, kenyaite, stevensite, vermiculite, halloysite, aluminate oxides, hydrotalcite, and mixtures thereof; preferably blending the nanoclay and the polymer by melt blending, solution blending, or emulsion blending to form the elastomeric nanocomposite;
(c) adding at least 10 phr of a graphitized carbon black to the elastomeric nanocomposite; preferably from 10 to 100 phr; from 30 to 80 phr; from 50 to 80 phr; or 60 phr; preferably wherein a carbon black was heated to a temperature of 200° C. or greater, 350° C. or greater, 500° C. or greater, 800° C. or greater, 1000° C. or greater, or 2500° C. or greater, for a time of at least 4 hours, at least 8 hours, at least 16 hours, at least 24 hours, or at least 36 hours, optionally under a substantially inert atmosphere, preferably under nitrogen, to provide the graphitized carbon black;
(d) optionally, adding a curative, at least one additional filler, and/or a processing oil;
(e) optionally, adding a secondary polymer; preferably wherein the secondary polymer is selected from the group consisting of natural rubbers, polybutadiene rubber, polyisoprene rubber, poly(styrene-co-butadiene) rubber, poly (isoprene-co-butadiene) rubber, styrene-isoprene-butadiene rubber, ethylene-propylene rubber, ethylene-propylene-diene rubber, and mixtures thereof;
(f) optionally, admixing at least one thermoplastic polymer selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly (phenylene ether), and mixtures thereof; preferably wherein admixing the thermoplastic polymer comprises dynamic vulcanization; and
(g) obtaining a nanoclay elastomer nanocomposite, where when the nanocomposite is used in an article, the article has a gas permeation coefficient of 80.0 cc*mm/[m²-day] at 40° C., 75 cc*mm/[m²-day] or lower, or 70 cc*mm/[m²-day] or lower.

7. A method of reducing permeability of an article, the method comprising:
(a) obtaining a polymer comprising units derived from isoolefins having from 4 to 7 carbon atoms to obtain a polymer blend; preferably wherein the polymer is a copolymer comprising units derived from at least one $C_4$ to $C_7$ isoolefin and at least one multiolefin; optionally the polymer is halogenated with either chlorine or bromine; preferably the polymer is a copolymer having a substantially homogeneous compositional distribution and comprising from about 8 to about 12 wt % of alkylstyrene moieties and from about 1.1 to about 1.5 wt % of a halogen and having Mw/Mn of less than about 6;
(b) adding at least 1 phr of a nanoclay to the polymer; preferably from 1 to 50 phr; from 5 to 20 phr; from 5 to 10 phr; 5 phr or 10 phr; preferably wherein the nanoclay is selected from montmorillonite, nontronite, beidellite, bentonite, volkonskoite, laponite, hectorite, saponite, sauconite, magadite, kenyaite, stevensite, vermiculite, halloysite, aluminate oxides, hydrotalcite, and mixtures thereof; preferably blending the nanoclay and the polymer by melt blending, solution blending, or emulsion blending to form an elastomeric nanocomposite;
(c) adding at least 10 phr of a carbon black to the nanocomposite; preferably from 10 to 100 phr; from 30 to 80 phr; from 50 to 80 phr; or 60 phr; preferably the carbon black is a graphitized carbon black, preferably wherein the carbon black was heated to a temperature of 200° C. or greater, 350° C. or greater, 500° C. or greater, 800° C. or greater, 1000° C. or greater, or 2500° C. or greater, for a time of at least 4 hours, at least 8 hours, at least 16 hours, at least 24 hours, or at least 36 hours, optionally under a substantially inert atmosphere, preferably under nitrogen, to provide the graphitized carbon black;
(d) optionally, adding a curative, at least one filler, and/or a processing oil;
(e) optionally, adding a secondary polymer; preferably wherein the secondary polymer is selected from the group consisting of natural rubbers, polybutadiene rubber, polyisoprene rubber, poly(styrene-co-butadiene) rubber, poly (isoprene-co-butadiene) rubber, styrene-isoprene-butadiene rubber, ethylene-propylene rubber, ethylene-propylene-diene rubber, and mixtures thereof;
(f) optionally, admixing at least one thermoplastic polymer selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly (phenylene ether), and mixtures thereof; preferably wherein admixing the thermoplastic polymer comprises dynamic vulcanization;
(g) obtaining an elastomeric nanocomposite;
(h) thereafter, calendaring and/or extruding the nanocomposite;
(i) thereby obtaining an oriented elastomeric nanocomposite having an orientation factor, $P_2$, in the face-off direction, of greater than 0.15; preferably is greater than 0, greater than 0.5, greater than 0.15, greater than 0.25, greater than 0.50, greater than 0.75, and most preferably, $P_2$ is 1.0; and preferably when the nanocomposite is used in an article, the article has a gas permeation coefficient of 80.0 cc*mm/[m²-day] at 40° C., 75 cc*mm/[m²-day] or lower, or 70 cc*mm/[m²-day] or lower.

Compositions comprising the nanocomposites of the invention may be extruded, compression molded, blow molded, injection molded, and laminated into various shaped articles including fibers, films, laminates, layers, industrial parts such as automotive parts, appliance housings, consumer products, packaging, and the like.

The nanocomposite compositions as described above may be used in the manufacture of air membranes such as innerliners, innertubes sidewalls, treads, bladders, and the like used in the production of tires. Methods and equipment used to manufacture the innerliners and tires are well known in the art. The invention is not limited to any particular method of manufacture for articles such as innerliners or tires. In particular, the nanocomposites are useful in compositions used in articles for a variety of tire applications such as truck tires, bus tires, automobile tires, motorcycle tires, off-road tires, aircraft tires, and the like.

In another application, elastomeric compositions comprising the nanocomposite may be employed in air cushions, pneumatic springs, air bellows, hoses, accumulator bags, and belts such as conveyor belts or automotive belts. They are useful in molded rubber parts and find wide applications in automobile suspension bumpers, auto exhaust hangers, and body mounts.

Additionally, elastomeric compositions comprising the nanocomposite may also be used as adhesives, caulks, sealants, and glazing compounds. They are also useful as plasticizers in rubber formulations; as components to compositions that are manufactured into stretch-wrap films; as dispersants for lubricants; and in potting and electrical cable filling materials.

EXAMPLE 1

Graphitized carbon black was prepared as shown below, and used in the nanocomposites as shown below.

Carbon black N660 was placed in a porcelain evaporating dish and heated in a furnace to a temperature of 300° C. for 8 hours to produce the graphitized carbon black. The graphitized carbon black was cooled to ambient temperature and used in the nanocomposites below.

Three nanocomposites were made, as described in the general method below, and using the compositions shown in Table 1. The sample was prepared by mixing the rubber/nanoclay masterbatch with optional carbon black, optional GCB, naphthenic oil, a processing resin (Struktol® 40 MS), and phenolic resin (SP1068) in a Brabender™ mixer at 135° C. at 60 rpm for 7 minutes. The curatives were added, including stearic acid, zinc oxide, sulfur, and MBTS, and the mixer was operated at 45° C. and 40 rpm for 4 minutes. The samples were cured at 170° C.

Nanocomposite 1 (NC1) contains no carbon black, Nanocomposite 2 (NC2) contains carbon black N660 (ungraphitized), and Nanocomposite 3 (NC3) contains graphitized carbon black. NC1 and NC2 are used as comparatives for inventive NC3. The composition of NC1, NC2, and NC3 are shown in Table 1 below.

TABLE 1

Composition of Nanocomposites 1, 2, & 3

| Material | Parts (phr) | | |
|---|---|---|---|
| | NC1 | NC2 | NC3 |
| BIMSM[1] Clay Masterbatch (100 parts rubber + x parts of clay) | 109 | 109 | 109 |
| Carbon black N660 | 0 | 60 | 0 |
| Graphitized Carbon Black (N660) | 0 | 0 | 60 |
| Naphthenic Oil | 8 | 8 | 8 |
| Processing resin (Struktol ® 40 MS) | 7 | 7 | 7 |
| Phenolic resin (SP1068) | 4 | 4 | 4 |
| Stearic Acid | 1.0 | 1.0 | 1.0 |
| ZnO (Kadox 911) | 1.0 | 1.0 | 1.0 |
| MBTS | 1.5 | 1.5 | 1.5 |
| Sulfur | 0.5 | 0.5 | 0.5 |
| TOTAL(phr) | 132.0 | 192.0 | 192.0 |

[1]BIMSM is Brominated Isobutyl para-Methyl Styrene elastomer, as designated by ISO1629

Specimens were cut for Mocon permeability measurements, as described below.

Permeability Test Methods

Oxygen permeability was measured using a Mocon Ox-Tran Model 2/61 oxygen transmission rate test apparatus and Perm-Net operating system (ASTM D3985). There were six cells per instrument where gas transmission through each test sample in a cell was measured individually. Thin, vulcanized test specimens from the sample compositions are mounted in diffusion cells. The test sample is approximately 1.5 inches by 1.5 inches (3.81 cm by 3.81 cm) with a total surface area of 10 cm². The error (2σ) in measuring oxygen permeability is ±0.245 (×10⁸) units. A zero reading to establish a baseline was obtained and samples were then tested at 40° C. Oxygen transmission was measured with an $O_2$ detector. Data was reported as a Permeation Coefficient in cemm/(m²-day) and Permeability Coefficient in cc*mm/(m²-day-mmHg).

The permeation coefficients are provided in Table 2 below.

TABLE 2

Permeation Rates for Samples NC1, NC2, & NC3

| Sample ID | Permeation Coefficient (cc*mm/m² · day, 40° C.) | Average Permeation Coefficient (cc*mm/m² · day, 40° C.) |
|---|---|---|
| Sample NC1 (comparative) | 137.94<br>136.06 | 137.00 |
| Sample NC2 (comparative) | 82.63<br>82.79 | 82.71 |
| Sample NC3 (inventive) | 78.53<br>80.14 | 79.34 |

As evident from the data above, the permeation coefficients for the inventive samples are significantly lower for the comparative examples. While not wishing to be bound by any one theory, it is believed that heating the carbon black to temperatures of 200° C. or greater substantially removes the polar surface groups, thereby leading to reduced interaction between the hydrophilic clay surface groups and the surface of the graphitized carbon black. The reduced interaction between the clay and the carbon black may result in enhanced dispersion which may lead to greater exfoliation and dispersion of the clay, thereby resulting in the observed lower permeation coefficients.

EXAMPLE 2

Three nanocomposites (NC4, NC5, and NC6) were made, as described in the general method below, and using the formulations shown in Table 3. Nanocomposites were prepared by mixing the rubber/nanoclay masterbatch with carbon black, naphthenic oil, processing resin (Struktol 40 MS), and phenolic resin (SP1068), and optional dicyclopentadiene hydrocarbon resin in a Kobelo Number 27, 200 kg Banbury™ mixer at 135° C. at 40 rpm for 4 minutes. The curatives were added, including stearic acid, zinc oxide, sulfur, and MBTS, and the mixer was operated at 100° C. and 30 rpm for a minimum time of 2 minutes. The samples were cured at 180° C.

NC4 is a bromobutyl comparative. NC5 and NC6 comprise a nanoclay elastomer nanocomposite (100 parts of Exxpro™ and 9 parts of nanoclay).

TABLE 3
Formulation of Nanocomposites

| Material | Parts (phr) | | |
|---|---|---|---|
| | NC4 | NC5 | NC6 |
| Bromobutyl 2222 (Mooney Viscosity[1] = 56 MU) | 100 | 0 | 0 |
| Nanocomposite A (Mooney Viscosity[1] = 74 MU) | 0 | 100 | 0 |
| Nanocomposite B (Mooney Viscosity[1] = 63 MU) | 0 | 0 | 100 |
| Carbon black N660 | 60 | 60 | 50 |
| Naphthenic Oil | 8 | 3.5 | 3.5 |
| Processing resin (Struktol 40 MS) | 7 | 7 | 7 |
| Phenolic resin (SP1068) | 4 | 4 | 4 |
| Dicyclopentadiene Hydrocarbon Resin | 0 | 0 | 8 |
| Stearic Acid | 1.0 | 1.0 | 1.0 |
| ZnO (Kadox 911) | 1.0 | 1.0 | 1.0 |
| MBTS | 1.25 | 1.25 | 1.25 |
| Sulfur | 0.5 | 0.5 | 0.5 |
| TOTAL (phr) | 182.75 | 178.25 | 175.25 |

[1]Mooney Viscosity was measured according to ASTM D 1646.

The nanocomposite compositions (NC4, NC5, and NC6) were transferred from the Banbury™ mixer to the tire calendar line. The composition was passed through a system of mills where it was heated and then transferred via a conveyer belt to a 4-roll Z-style calendar. Calendar rolls were kept at a temperature of 80° C. As the sheet with the desired gauge for tire building came off the calendar rolls, it was passed through a series of tension rolls, air cooled, and then plied with a backing compound.

Samples of the comparative NC4 and NC5 and NC6 compounds were collected at the first non-productive stage (1$^{st}$ NP stage), the final mixing (productive) stage, and after the extruded innerliner and innerliner calendering operations. The collected samples were studied for clay dispersion and clay plate alignment using TEM. The clay dispersion and orientation of the clay platelets within these samples was determined using SAXS. The permeation coefficient of the samples was also measured using the Mocon OX-TRAN methods outlined above.

TEM Sample Preparation:

The nanocomposite compounds were cryo-microtomed at −150° C. using a diamond knife to obtain sections of 100 nm thickness for TEM characterization. The samples were not stained.

TEM Methods:

2D TEM images were acquired on a JEOL 2000FX TEM instrument at 160 kV accelerating voltage. Multiple images from various locations at different magnifications were collected to provide an overall assessment of dispersion uniformity.

For 3D TEM, the FEI Tecnai TEM instrument (G2 F20 Super Twin TMP) was used. All samples were run using STEM-HAADF tomography where the samples are run on the scanning transmission electron microscopy high-angle annular dark field (STEM-HAADF) mode to minimize the sample damage while maximizing the contrast. During the measurement, the sample was tilted from a 0° angle to −60°, which took about 90 minutes, and the samples were tilted back from a 0° angle to 60°, which took another 90 minutes, giving a total exposure time of 3 hours. The images were reconstructed using the Voltex 3D volume rendering software.

TEM Results

The TEM micrographs were qualitatively assessed for each of NC5 and NC6. The micrographs of the samples of each stage of processing were compared to determine trends in microstructure.

(i) NC5 (Inventive, High Mooney Viscosity)

From a qualitative viewing of the images collected for NC5 samples, it was observed that the nanoclay stack size was reduced over the course of the sample processing. The nanoclay stacks in the sample collected from the 1$^{st}$ NP stage were larger than the nanoclay stacks in the sample collected after calendering and extrusion. Also, the large agglomerates observed in the sample collected from the 1$^{st}$ NP stage were conspicuously missing from the sample collected after calendering and extrusion. Without wishing to be bound by theory, the inventors suggest that the reduction in nanoclay stack size was achieved by elastic and shear forces experienced during the mixing, calendering, and extrusion. The inventors further suggest that the reduction in nanoclay stack size may be due to reduced nanoclay-nanoclay interactions, and better exfoliation of the nanoclay.

(ii) NC6 (Inventive, Low Mooney Viscosity)

The TEM micrographs for the low Mooney Viscosity innerliner compound show large clay aggregates up to 200 μm in diameter in the non-productive stage sample. However, in the productive stage sample, the clay plates appeared to have separated and formed an intercalated state (near exfoliated state). Association of the clay plates with carbon black particles was also observed.

SAXS Methods

Time-resolved 2D SAXS patterns were measured using the Advanced Polymers Beamline (X27C) at the National Synchotron Light Source (NSLS), Brookhaven National Laboratory (BNL). The wavelength of the x-ray beam was 1.371 Å. The beam size was 0.4 mm in diameter at the sample position. Synchotron x-rays were collimated with a three-piece tantalum pinhole collimator system. The sample-to detector distance was 1.73 m. The SAXS scattering angle was calibrated with silver behenate, and the intensity was normalized by incident beam fluctuations. The SAXS images were corrected for beam fluctuation, sample absorption, and background scattering. The relative uncertainty associated with the x-ray measurement was ±5%. The SAXS patterns were further analyzed to generate SAXS profiles and to generate orientation parameters, $P_2$.

SAXS Results

The orientation parameter, $P_2$, derived from the SAXS data is shown in Table 4, below.

TABLE 4

Orientation Parameter ($P_2$)

| Sample | Stage Sampled | Face-On | Edge-On |
| --- | --- | --- | --- |
| NC4 (Comparative) | Productive | 0.0224 | 0.0810 |
|  | Extruded Liner | 0.0255 | 0.0408 |
| NC5 (Inventive, High Mooney Viscosity) | 1$^{st}$ NP | — | 0.1672 |
|  | 3$^{rd}$ NP | 0.0226 | 0.1805 |
|  | Productive | 0.0217 | 0.2554 |
|  | Innerliner | 0.0158 | 0.0293 |
| NC6 (Inventive, Low Mooney Viscosity) | 1$^{st}$ NP | 0.0192 | 0.2719 |
|  | Productive | 0.0166 | 0.2198 |
|  | Extruded (0.95 mm) | 0.0251 | 0.1607 |
|  | Extruded (1.6 mm) | 0.0200 | 0.1756 |
|  | Extruded (2.2 mm) | 0.0201 | 0.2050 |
|  | Calendered | 0.0363 | 0.2021 |
|  | Innerliner | 0.0163 | 0.0775 |

The inventive samples appeared to have similar or more desirable alignment than the comparative NC4 sample. The inventors acknowledge that nanoclay-carbon black interactions may adversely affect platelet orientation in NC5 and NC6 samples.

Permeability

The permeation coefficient was determined for samples containing NC5. The permeation coefficient of the final productive compound is 136 cc*mm/(m$^2$-day). After extrusion, it drops to 130 cc*mm/(m$^2$-day). This improvement in permeability may be due to improved platelet alignment in the extruded innerliner.

To further improve the platelet orientation (thereby reducing permeability) the GCB N660 may be used in place of carbon black N660.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, "comprising" encompasses the terms "consisting essentially of," "is," and "consisting of" and anyplace "comprising" is used "consisting essentially of," "is," or "consisting of" may be substituted therefor.

What is claimed is:

1. An elastomeric nanocomposite comprising:
   (a) at least one elastomeric polymer comprising units derived from isoolefins having from 4 to 7 carbon atoms, the elastomeric polymer having a viscosity average molecular weight in the range of from 400,000 to 2,000,000;
   (b) at least 10 phr of a graphitized carbon black, the graphitized carbon black having been prepared by heating a carbon black having an average diameter in the range of 10 to 95 nm to a temperature of 300° C. for at least 8 hours; and
   (c) from 0.5 to 10 wt % of a smectite or smectite-type nanoclay,
   wherein the elastomeric nanocomposite has at least 20% less aggregates of the graphitized carbon black and the nanoclay in comparison to the same elastomeric nanocomposite prepared with an ungraphitized form of the carbon black, and
   wherein when the nanocomposite is used in an article, the article has a gas permeation coefficient of 80.0 cc*mm/[m$^2$-day] or less at 40° C.

2. The nanocomposite of claim 1, wherein the polymer comprises units derived from at least one C4 to C7 isoolefin and (i) 8 to 0.5 wt % of at least one multiolefin or 5 to 10 wt % alkylstyrene.

3. The nanocomposite of claim 1, wherein the nanocomposite is further blended with a thermoplastic polymer selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly(phenylene ether), and mixtures thereof to form a polymer blend.

4. The nanocomposite of claim 3, wherein the nanocomposite and the thermoplastic polymer are dynamically vulcanized together.

5. The nanocomposite of claim 1, wherein the nanoclay is selected from montmorillonite, nontronite, beidellite, bentonite, volkonskoite, laponite, hectorite, saponite, sauconite, magadite, kenyaite, stevensite, vermiculite, halloysite, aluminate oxides, hydrotalcite, and mixtures thereof.

6. An article comprising the nanocomposite of claim 1.

7. The article of claim 6, wherein the article is an innerliner or a film.

8. A method for reducing the permeability of an article comprising an elastomeric nanocomposite, the elastomeric nanocomposite being prepared by the following steps:
   (a) heating a carbon black having an average diameter in the range of 10 to 95 nm to a temperature of 200° C. to 300° C., for a time of at least 8 hours, optionally under nitrogen, to obtain a graphitized carbon black wherein the graphitized carbon black is more hydrophobic than the carbon black,
   (b) obtaining an elastomeric polymer comprising units derived from (i) isoolefins having from 4 to 7 carbon atoms and (ii) 5 to 10 wt % alkyl-styrene or 0.5 to 8 wt % isoprene;
   (c) blending from 0.5 to 10 wt % of a smectite or smectite-type nanoclay with the polymer to obtain an elastomeric nanocomposite; and
   (d) adding at least 10 phr of the graphitized carbon black to the elastomeric nanocomposite.

9. The method of claim 8, wherein the blending is one of melt blending, solution blending, or emulsion blending.

10. The method of claim 8, further comprising admixing at least one thermoplastic polymer selected from the group consisting of polyamides, polyimides, polycarbonates, polyesters, polysulfones, polylactones, polyacetals, acrylonitrile-butadiene-styrene polymers, polyphenyleneoxide, polyphenylene sulfide, polystyrene, styrene-acrylonitrile polymers, styrene maleic anhydride polymers, aromatic polyketones, poly(phenylene ether), and mixtures thereof.

11. The method of claim 8, wherein the nanoclay is at least one of montmorillonite, nontronite, beidellite, bentonite, volkonskoite, laponite, hectorite, saponite, sauconite, magadite, kenyaite, stevensite, vermiculite, halloysite, aluminate oxides, and hydrotalcite.

12. An article made from the elastomeric nanocomposite obtained by the method of claim 8.

13. The article of claim 12, wherein the article has a gas permeation coefficient of 80.0 cc*mm/[m$^2$-day] or less at 40° C.

14. The nanocomposite of claim 1, wherein the elastomeric polymer is halogenated with chlorine or bromine.

15. The method of claim 8, wherein the elastomeric polymer is halogenated with chlorine or bromine.

* * * * *